US012740911B2

(12) United States Patent
Song et al.

(10) Patent No.: US 12,740,911 B2

(45) Date of Patent: Sep. 22, 2026

(54) FLEXIBLE LIFTING MECHANISM FOR ANTI-GRAVITY TREADMILL

(71) Applicant: TIANJIN GOLDENALL MEDICAL DEVICE CO., LTD, Tianjin (CN)

(72) Inventors: Weiheng Song, Tianjin (CN); Chengcheng Chu, Tianjin (CN)

(73) Assignee: TIANJIN GOLDENALL MEDICAL DEVICE CO., LTD, Tianjin (CN)

( * ) Notice: Subject to any disclaimer, the term of this patent is extended or adjusted under 35 U.S.C. 154(b) by 110 days.

(21) Appl. No.: 18/808,122

(22) Filed: Aug. 19, 2024

(65) Prior Publication Data

US 2026/0047975 A1 Feb. 19, 2026

(30) Foreign Application Priority Data

Jun. 20, 2023 (CN) ........................ 202310729016.5

(51) Int. Cl.

*A63B 22/02* (2006.01)

*A61H 3/00* (2006.01)

(52) U.S. Cl.

CPC ............ *A61H 3/008* (2013.01); *A63B 22/02* (2013.01); *A61H 2003/007* (2013.01); *A61H 2201/0103* (2013.01); *A61H 2201/0192* (2013.01); *A61H 2201/163* (2013.01)

(58) Field of Classification Search

CPC .. A63B 22/02; A61H 3/008; A61H 2003/007; A61H 2201/0103; A61H 2201/0192; A61H 2201/163

USPC ...................................................... 242/390.1

See application file for complete search history.

(56) References Cited

U.S. PATENT DOCUMENTS

| | | | | |
|---|---|---|---|---|
| 5,176,597 | A * | 1/1993 | Bryne | A61H 3/008 482/54 |
| 7,762,930 | B2 * | 7/2010 | Egger | A61H 1/0237 482/57 |
| 12,171,715 | B2 * | 12/2024 | Whalen | A61H 9/00 |
| 2014/0113775 | A1 * | 4/2014 | Egan | A63B 21/00181 482/54 |
| 2017/0128769 | A1 * | 5/2017 | Long | A61G 10/02 |
| 2019/0255381 | A1 * | 8/2019 | Bayerlein | A63B 22/025 |
| 2019/0392939 | A1 * | 12/2019 | Basta | G16H 20/30 |
| 2020/0398103 | A1 * | 12/2020 | Moore | A63B 69/0064 |

(Continued)

FOREIGN PATENT DOCUMENTS

| | | | |
|---|---|---|---|
| CN | 102481225 | A | 5/2012 |
| CN | 101896152 | B | 12/2014 |
| CN | 106794107 | A | 5/2017 |

*Primary Examiner* — Joshua T Kennedy

(74) *Attorney, Agent, or Firm* — Cooper Legal Group, LLC

(57) ABSTRACT

A flexible lifting mechanism for an anti-gravity treadmill is provided, which includes a waist loop, a waist loop fixing strap, waist loop handles, height adjustment straps, and adjustment roller assemblies. A first end of the waist loop fixing strap is connected to an airbag, and a second end of the waist loop fixing strap is fixed to a front frame. A first end of each of the waist loop handles is hingedly connected to the waist loop, and a second end of each of the waist loop handles is engaged with a middle frame. Each of the adjustment roller assemblies is mounted in a base. A first end of each of the height adjustment straps is fixedly connected to the waist loop, and a second end of each of the height adjustment straps is connected to a corresponding one of the adjustment roller assemblies.

10 Claims, 9 Drawing Sheets

(56) References Cited

U.S. PATENT DOCUMENTS

| | | | | |
|---|---|---|---|---|
| 2021/0187348 | A1* | 6/2021 | Phillips | A63B 22/02 |
| 2022/0401782 | A1* | 12/2022 | Whalen | A63B 21/4009 |
| 2023/0115873 | A1* | 4/2023 | Whalen | A63B 22/02<br>482/54 |

* cited by examiner

FLEXIBLE LIFTING MECHANISM FOR ANTI-GRAVITY TREADMILL

CROSS REFERENCE TO THE RELATED APPLICATIONS

This application claims the priority benefit of China application serial no. 202310729016.5, filed on Jun. 20, 2023. The entirety of the above-mentioned patent application is hereby incorporated by reference herein and made a part of this specification.

TECHNICAL FIELD

The present disclosure belongs to the field of exercise or rehabilitation, and specifically relates to a flexible lifting mechanism for an anti-gravity treadmill.

BACKGROUND

The working principle of an anti-gravity treadmill is that a patient puts on sealable tight shorts which then are connected to an airbag to form an airtight chamber. The air pressure inside the airtight chamber is higher than the air pressure outside the airtight chamber, resulting in an air pressure difference. The air pressure difference (which can provide a variable lifting force to reduce the walking load) is used to generate buoyancy for the patient. The air pressure difference is adjusted to achieve different reduced body weight percentages to minimize the impact of the patient's body weight during walking. Up to now, technical solutions that have been disclosed include Chinese Patent No. CN101896152B entitled "SYSTEM, METHOD AND DEVICE FOR DIFFERENTIAL AIR PRESSURE APPARATUS", Chinese Patent Publication No. CN102481225A entitled "DIFFERENTIAL AIR PRESSURE SYSTEM", Chinese Patent Publication No. CN106794107A entitled "PRESSURE CHAMBER AND LIFTING DEVICE FOR DIFFERENTIAL AIR PRESSURE SYSTEM CAPABLE OF COLLECTING MEDICAL DATA", and the like.

The lifting device in the above technical solutions that have been disclosed involves a complex shape, a complicated production process, and a complicated operation during lifting for adjustment, which is difficult for a single person to operate, leading to high costs, complex structure, and cumbersome assembly process of the device, and affecting the use experience of the patient.

SUMMARY

An objective of the present disclosure is to provide a flexible lifting mechanism for an anti-gravity treadmill, which can adapt to the heights of different people and has the advantages of simple operation, high safety, and simple production process.

To achieve the above objective, the present disclosure provides the following technical solutions. A flexible lifting mechanism for an anti-gravity treadmill is provided. The flexible lifting mechanism for the anti-gravity treadmill is configured to be mounted between an airbag and a treadmill frame. The treadmill frame includes a front frame, a base, and a middle frame. The flexible lifting mechanism for the anti-gravity treadmill includes a waist loop, a waist loop fixing strap, waist loop handles, height adjustment straps, and adjustment roller assemblies. The waist loop is fixed to an upper side of the airbag. A first end of the waist loop fixing strap is connected to the airbag, and a second end of the waist loop fixing strap is fixed to the front frame. A first end of each of the waist loop handles is hingedly connected to the waist loop, and a second end of each of the waist loop handles is engaged with the middle frame. Each of the adjustment roller assemblies is mounted in the base, a first end of each of the height adjustment straps is fixedly connected to the waist loop, and a second end of each of the height adjustment straps is connected to a corresponding one of the adjustment roller assemblies.

Preferably, each of the adjustment roller assemblies includes end housings, a roller, and positioning pins, where two ends of the roller are respectively mounted in the end housings, and the positioning pins are respectively mounted on the end housings.

Preferably, each of the adjustment roller assemblies further includes end caps, roller pins, left limiting pins, right limiting pins, and limiting levers, where each of the end caps is fixed to an outer side of a respective one of the end housings, the roller pins are respectively fixed to end portions of the roller, each of the limiting levers is hingedly connected to an inner side of a respective one of the end caps, and each of the left limiting pins and a respective one of the right limiting pins are symmetrically fixed on two sides of a respective one of the limiting levers.

Preferably, a movable clamp plate is arranged on the roller, the movable clamp plate is connected to the roller by a bolt, and an end portion of one of the height adjustment straps is fixedly clamped between the movable clamp plate and the roller.

Preferably, pin holes are formed on the roller and are respectively adapted to the positioning pins.

Preferably, a lower end of each of the limiting levers is conical, and the left limiting pins and the right limiting pins are respectively fixed on the end caps.

Preferably, the each of the left limiting pins and the respective one of the right limiting pins are fixed below a hinge point of the respective one of the limiting levers.

Preferably, engaging stop blocks are arranged on the middle frame.

Compared with the prior art, the present disclosure has the following advantages. The flexible lifting mechanism of the present disclosure has a light weight and no need for the arrangement of an additional balance weight, and the flexible lifting mechanism of the present disclosure is convenient to maintain and involves low costs.

The height of the waist loop can be adjusted by shortening or elongating the height adjustment straps through the adjustment roller assemblies, and the waist loop can be quickly positioned by the positioning pins.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION OF THE EMBODIMENTS

Figure 1:
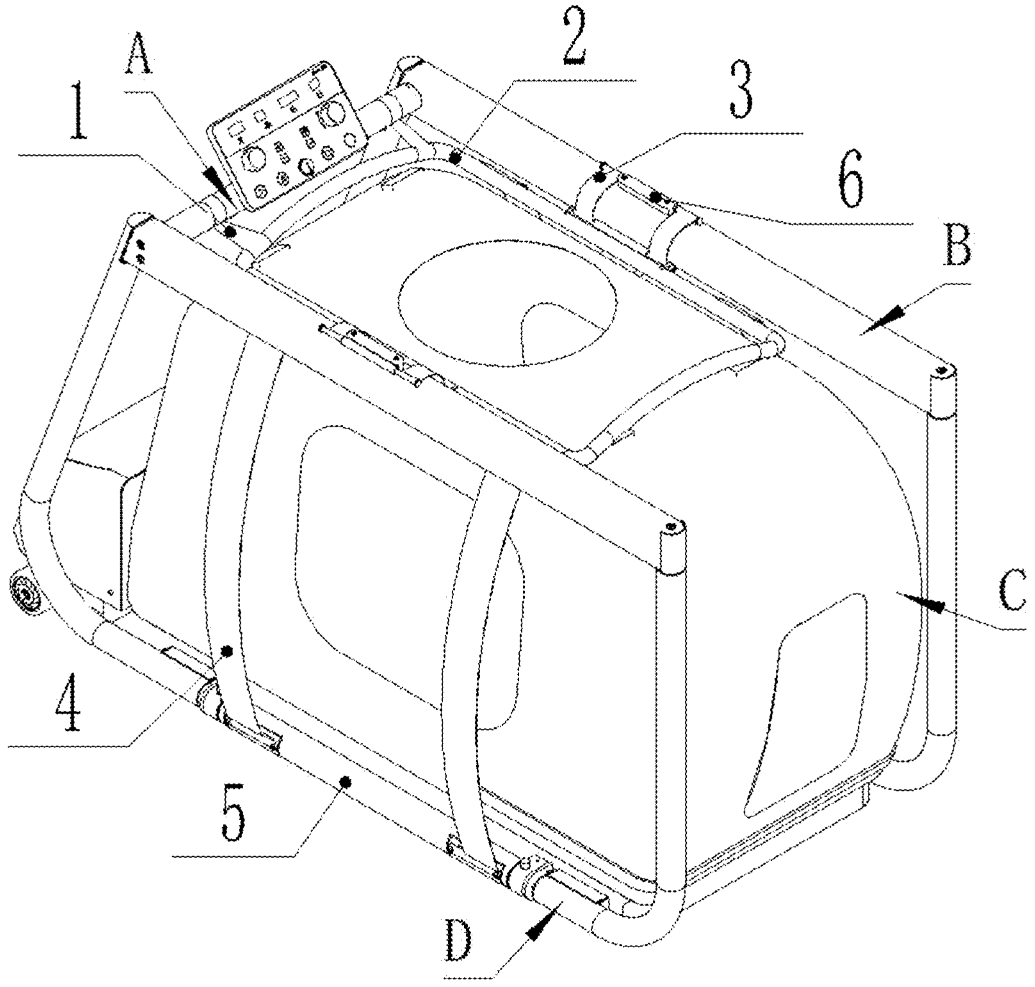
FIG. 1 is a schematic structural diagram of a flexible lifting mechanism in a usage state according to the present disclosure.
Figure 2:
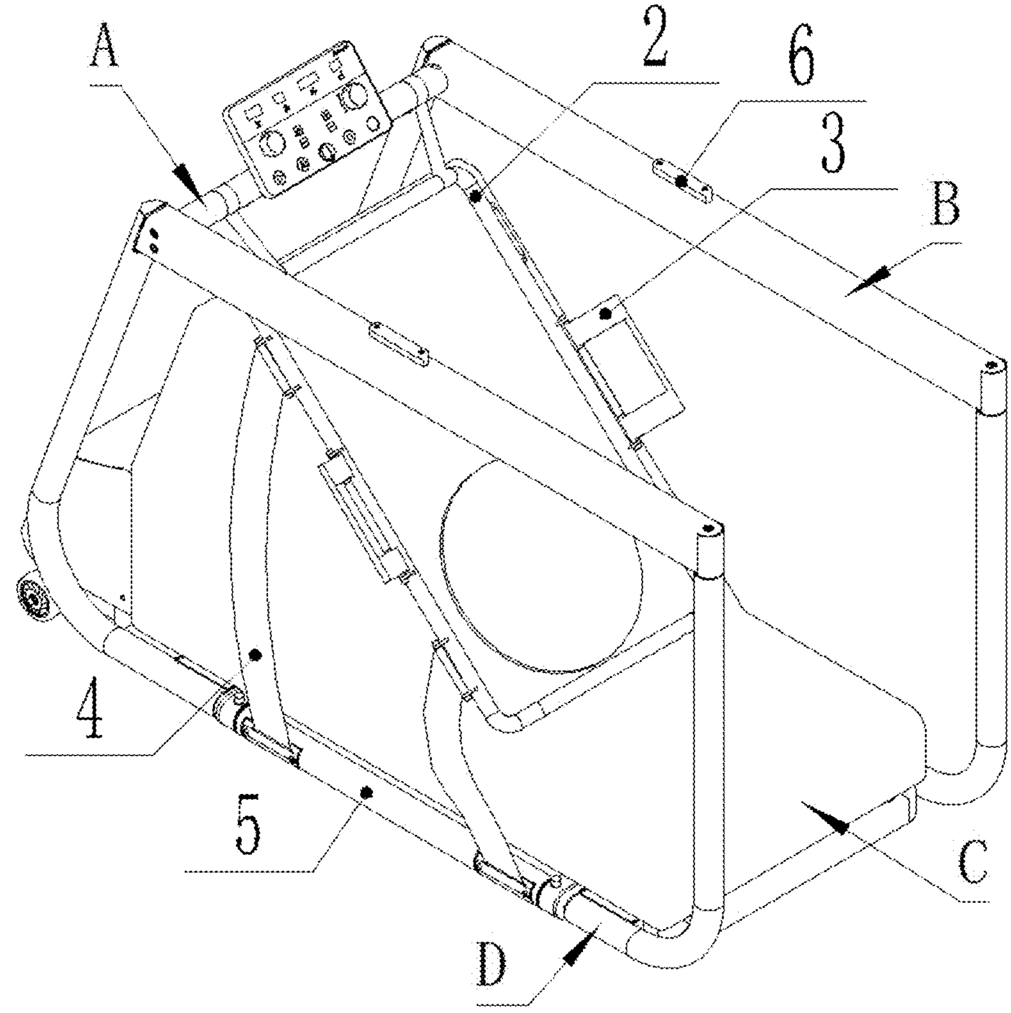
FIG. 2 is a schematic structural diagram of the flexible lifting mechanism in a retracted state according to the present disclosure.
Figure 3:
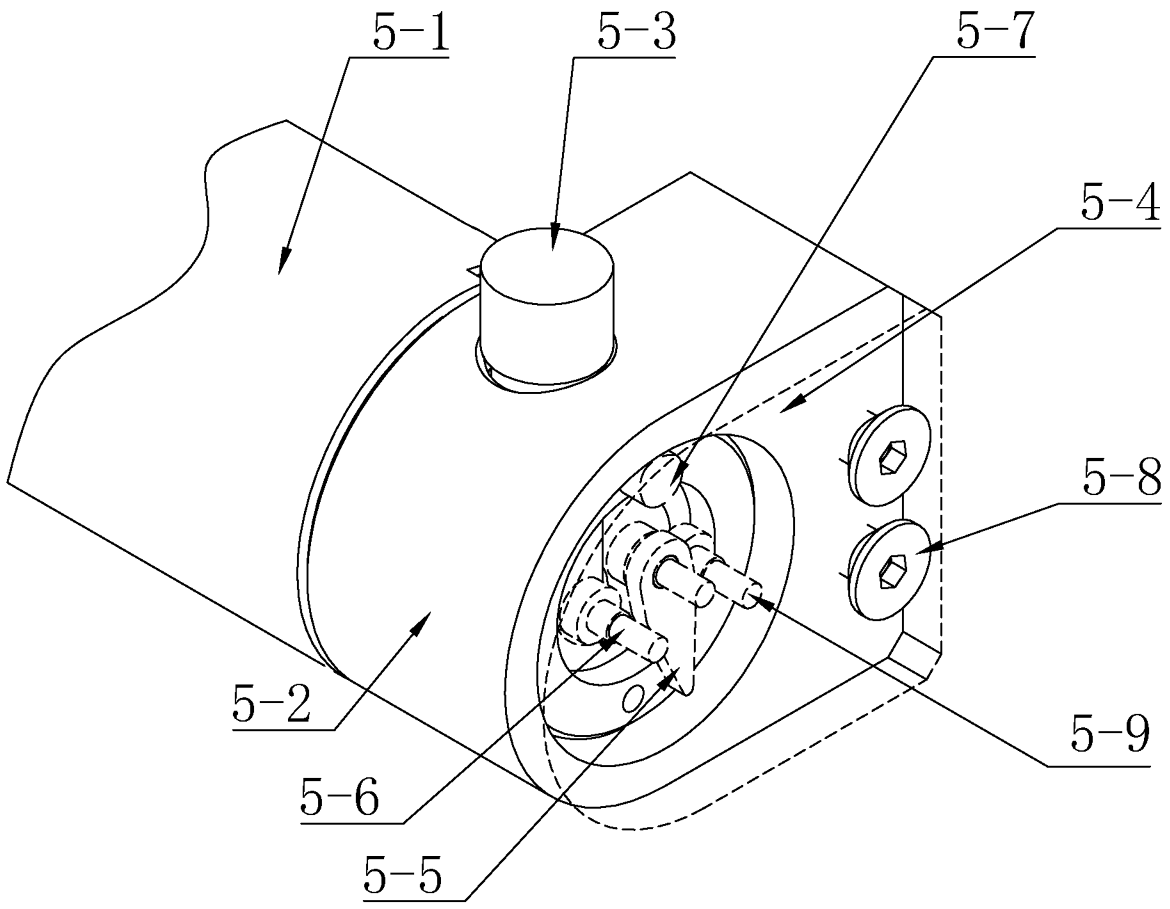
FIG. 3 is a schematic structural diagram of an end portion of an adjustment roller assembly.

The technical solutions in the embodiments of the present disclosure will be described clearly and fully with reference to the accompanying drawings in the embodiments of the present disclosure. Apparently, the embodiments described are merely some embodiments, rather than all of the embodiments of the present disclosure. All other embodiments obtained by those of ordinary skill in the art without creative efforts based on the embodiments of the present disclosure shall fall within the protection scope of the present disclosure.

Embodiments

Referring to FIG. 1 to FIG. 7, a first embodiment of the present disclosure provides a flexible lifting mechanism for an anti-gravity treadmill. The flexible lifting mechanism for the anti-gravity treadmill is configured to be mounted between an airbag C and a treadmill frame. The treadmill frame includes a front frame A, a base D, and a middle frame B. The flexible lifting mechanism for the anti-gravity treadmill includes a waist loop 2, a waist loop fixing strap 1, waist loop handles 3, height adjustment straps 4, and adjustment roller assemblies 5. The waist loop 2 is fixed to an upper side of the airbag C. A first end of the waist loop fixing strap 1 is connected to the airbag C, and a second end of the waist loop fixing strap 1 is fixed to the front frame A. A first end of each of the waist loop handles 3 is hingedly connected to the waist loop 2, and a second end of each of the waist loop handles 3 is engaged with the middle frame B. Each of the adjustment roller assemblies 5 is mounted in the base D. A first end of each of the height adjustment straps 4 is fixedly connected to the waist loop 2, and a second end of each of the height adjustment straps 4 is connected to a corresponding one of the adjustment roller assemblies 5.

Further, each of the height adjustment straps 4 is made of a flexible material. The waist loop handles 3 may be directly hooked to the engaging stop blocks 6, respectively.

Further, each of the adjustment roller assemblies 5 includes end housings 5-2, end caps 5-4, a roller 5-1, roller pins 5-7, left limiting pins 5-6, right limiting pins 5-9, limiting levers 5-5, and positioning pins 5-3. Two ends of the roller 5-1 are respectively mounted in the end housings 5-2, and the roller 5-1 is configured to rotate in the end housings 5-2. Each of the end caps 5-4 is fixed to an outer side of a respective one of the end housings 5-2. The roller pins 5-7 are respectively fixed to end portions of the roller 5-1. Each of the limiting levers 5-5 is hingedly connected to an inner side of a respective one of the end caps 5-4. Each of the left limiting pins 5-6 and a respective one of the right limiting pins 5-9 are symmetrically fixed on two sides of a respective one of the limiting levers 5-5. The positioning pins 5-3 are mounted on the end housings 5-2 and pass through pin holes on the roller 5-1, respectively.

Figure 4:
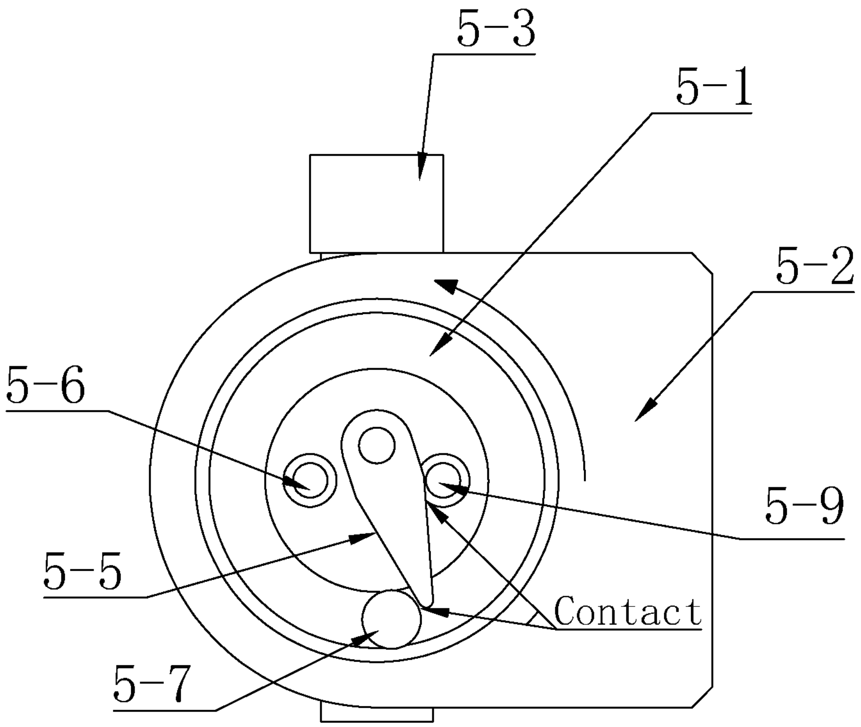
FIG. 4 is a schematic diagram showing a counterclockwise limit position of the adjustment roller assembly.
Figure 5:
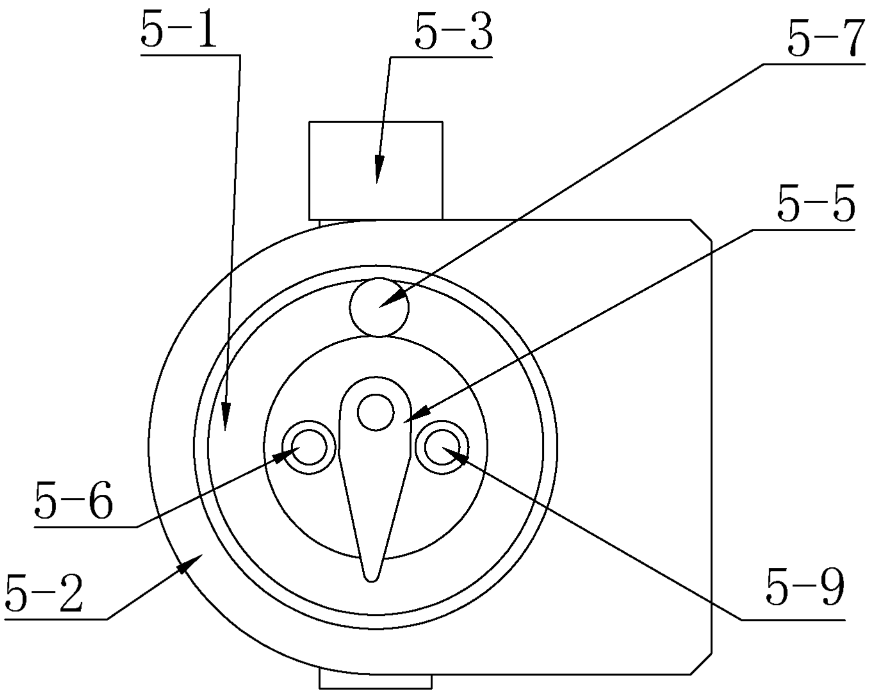
FIG. 5 is a schematic diagram showing an intermediate position of the adjustment roller assembly.
Figure 6:
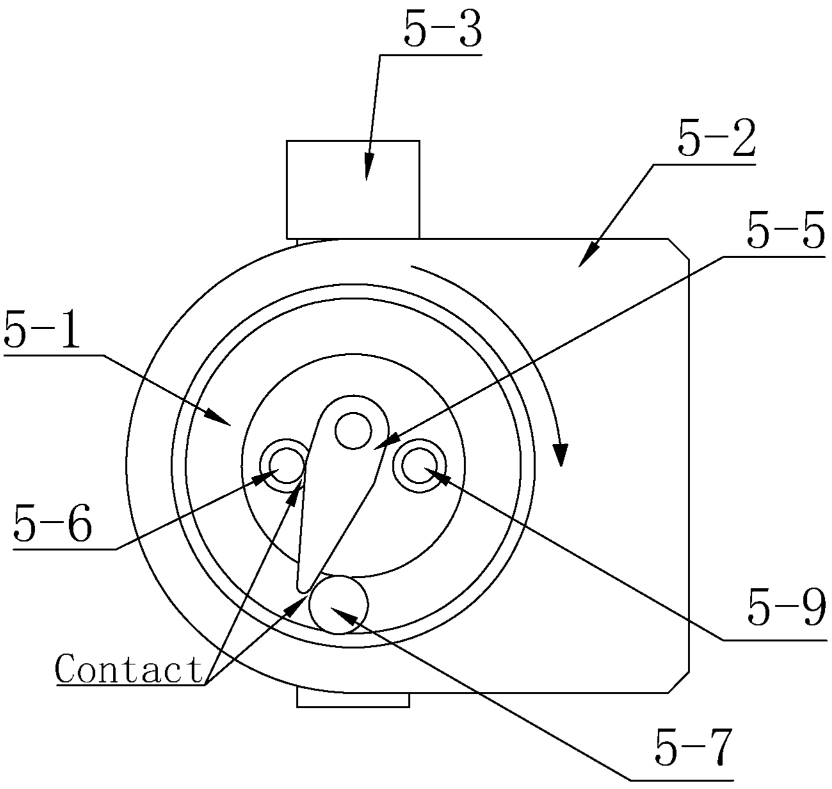
FIG. 6 is a schematic diagram showing a clockwise limit position of the adjustment roller assembly.
Figure 7:
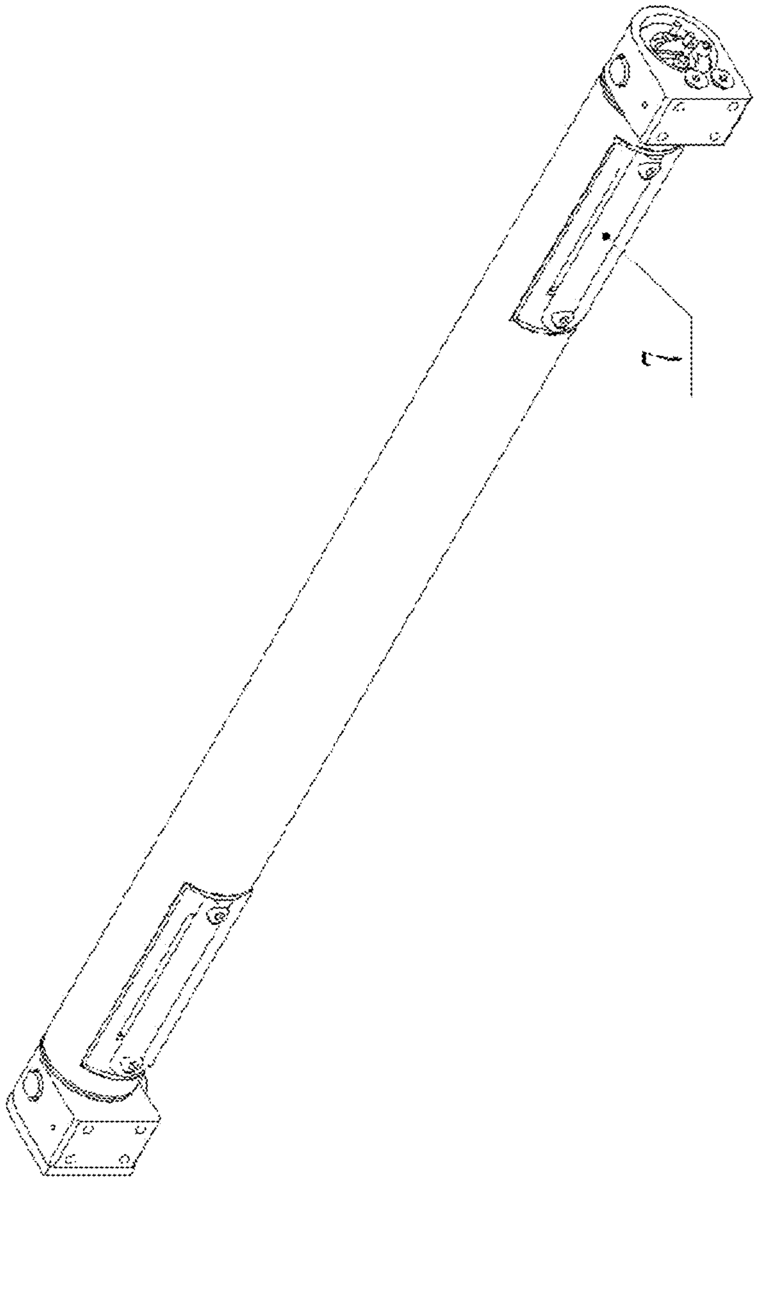
FIG. 7 is a schematic structural diagram of the adjustment roller assembly.
Figure 8:
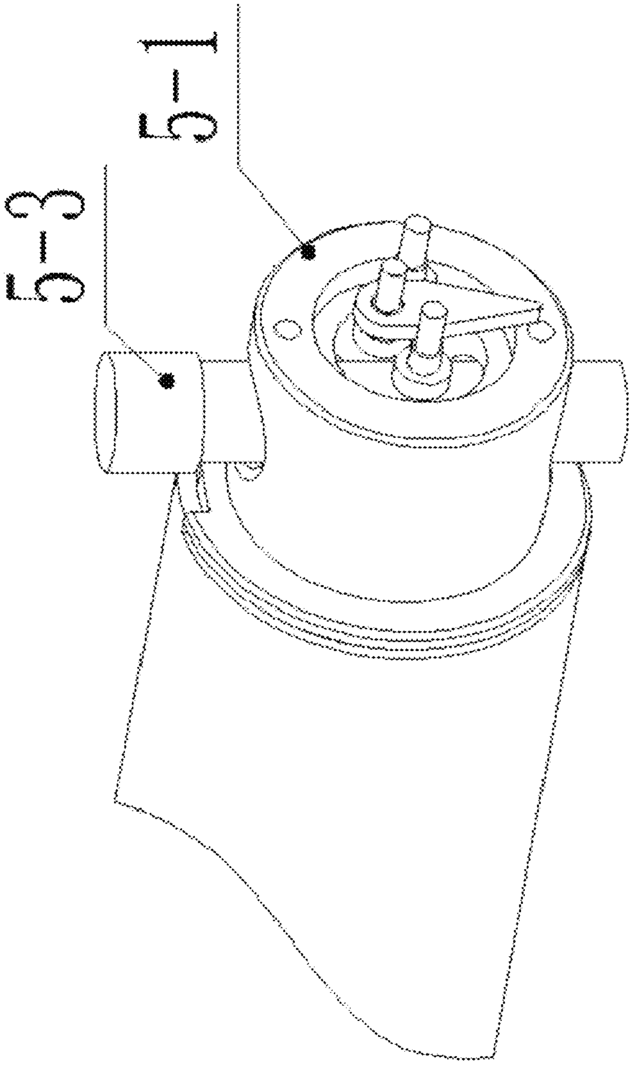
FIG. 8 is a schematic structural diagram of the end portion of the adjustment roller assembly.
Figure 9:
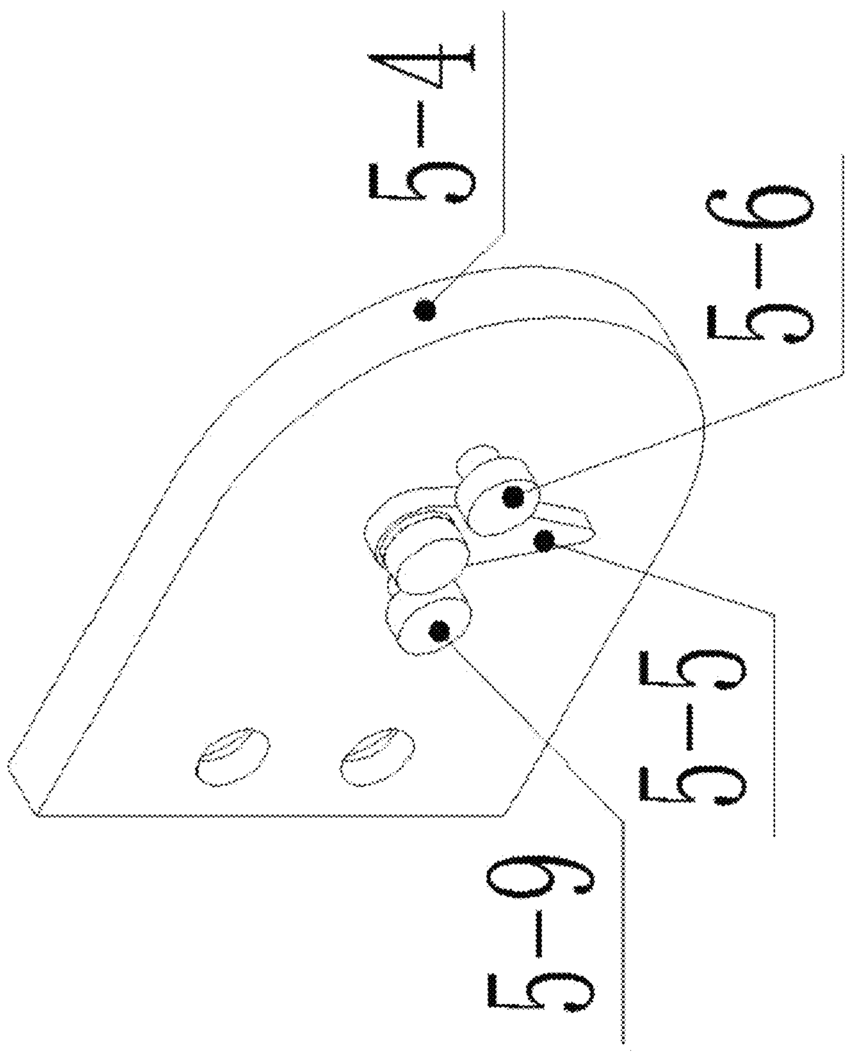
FIG. 9 is a schematic diagram showing positions of an end cap, a limiting lever, a left limiting pin, and a right limiting pin.

Further, as shown in FIG. 4 to FIG. 6, each of the adjustment roller assemblies 5 has three adjustment positions, and the height of the airbag C is adjusted by controlling the shortening or elongation of the height adjustment straps 4. As shown in FIG. 4, when the roller 5-1 is rotated counterclockwise, the roller pins 5-7 on the roller 5-1 push the limiting levers 5-5 to rotate, respectively. When the limiting levers 5-5 are in contact with the right limiting pins 5-9 respectively, a limit position is reached. As shown in FIG. 6, when the roller 5-1 is rotated clockwise, the roller pins 5-7 on the roller 5-1 push the limiting levers 5-5 to rotate, respectively. When the limiting levers 5-5 are in contact with the left limiting pins 5-6 respectively, a limit position is reached. Corresponding to the above limit positions, the length of the height adjustment straps 4 can be adjusted in a range from 5 cm to 15 cm. When the roller pins 5-7 are at an uppermost position, the height adjustment straps 4 are in an intermediate length state. Thus, each of the adjustment roller assemblies 5 has three adjustment positions for the purpose of adjustment.

Further, a movable clamp plate 7 is arranged on the roller 5-1, the movable clamp plate 7 is connected to the roller 5-1 by a bolt, and an end portion of one of the height adjustment straps 4 is fixedly clamped between the movable clamp plate 7 and the roller 5-1.

Further, the pin holes are formed on the roller 5-1 and are respectively adapted to the positioning pins 5-3.

Further, a lower end of each of the limiting levers 5-5 is conical, and the left limiting pins 5-6 and the right limiting pins 5-9 are respectively fixed on the end caps 5-4.

Further, the each of the left limiting pins 5-6 and the respective one of the right limiting pins 5-9 are fixed below a hinge point of the respective one of the limiting levers 5-5.

Although the embodiments of the present disclosure have been illustrated and described in the above detailed description, it should be understood by those of ordinary skill in the art that various changes, variations, substitutions and modifications can be made to these embodiments without departing from the principle and spirit of the present disclosure. The scope of the present disclosure is defined by the appended claims and equivalents thereof.

What is claimed is:

1. A flexible lifting mechanism for an anti-gravity treadmill, comprising:
- an airbag; and
- a treadmill frame, wherein the treadmill frame comprises a front frame, a base, and a middle frame, wherein the flexible lifting mechanism is configured to be mounted between the airbag and the treadmill frame, wherein
- the flexible lifting mechanism comprises;
  - a waist loop fixed to an upper side of the airbag;
  - a waist loop fixing strap, wherein:
    - a first end of the waist loop fixing strap is fixed to an upper side of the airbag; and
    - a second end of the waist loop fixing strap is fixed to the front frame;
  - waist loop handles, wherein:
    - a first end of each of the waist loop handles are hingedly connected to the waist loop; and
    - a second end of each of the waist loop handles are engaged with the middle frame;
  - adjustment roller assemblies, wherein each of the adjustment roller assemblies are mounted within the base and configured to rotate relative to the base; and height adjustment straps, wherein:

a first end of each of the height adjustment straps are fixedly connected to the waist loop;

a second end of each of the height adjustment straps are fixedly connected to a corresponding one of the adjustment roller assemblies; and wherein the height of the airbag is adjusted by controlling shortening or elongation of the height adjustment straps by rotating the adjustment roller assemblies relative to the base such that the height of the waist loop may be positioned by positioning pins extending through the adjustment roller assemblies.

2. The flexible lifting mechanism for the anti-gravity treadmill according to claim 1, wherein each of the adjustment roller assemblies comprises end housings, a roller, and the positioning pins, wherein two ends of the roller are respectively mounted in the end housings, and the positioning pins are respectively mounted on the end housings.

3. The flexible lifting mechanism for the anti-gravity treadmill according to claim 2, wherein each of the adjustment roller assemblies further comprises end caps, roller pins, left limiting pins, right limiting pins, and limiting levers, wherein each of the end caps is fixed to an outer side of a respective one of the end housings, the roller pins are respectively fixed to end portions of the roller, each of the limiting levers is hingedly connected to an inner side of a respective one of the end caps, and each of the left limiting pins and a respective one of the right limiting pins are symmetrically fixed on two sides of a respective one of the limiting levers.

4. The flexible lifting mechanism for the anti-gravity treadmill according to claim 3, wherein a clamp plate is arranged on the roller, the clamp plate is connected to the roller by a bolt, and an end portion of one of the height adjustment straps is fixedly clamped between the clamp plate and the roller.

5. The flexible lifting mechanism for the anti-gravity treadmill according to claim 3, wherein pin holes are formed on the roller and are respectively adapted to the positioning pins.

6. The flexible lifting mechanism for the anti-gravity treadmill according to claim 3, wherein a lower end of each of the limiting levers is conical, and the left limiting pins and the right limiting pins are respectively fixed on the end caps.

7. The flexible lifting mechanism for the anti-gravity treadmill according to claim 3, wherein a lower end of each of the limiting levers is conical, and the each of the left limiting pins and the respective one of the right limiting pins are fixed below a hinge point of the respective one of the limiting levers.

8. The flexible lifting mechanism for the anti-gravity treadmill according to claim 2, wherein a clamp plate is arranged on the roller, the clamp plate is connected to the roller by a bolt, and an end portion of one of the height adjustment straps is fixedly clamped between the clamp plate and the roller.

9. The flexible lifting mechanism for the anti-gravity treadmill according to claim 2, wherein pin holes are formed on the roller and are respectively adapted to the positioning pins.

10. The flexible lifting mechanism for the anti-gravity treadmill according to claim 1, wherein engaging stop blocks are arranged on the middle frame.

* * * * *